July 26, 1960 J. LUCKHARDT Re. 24,849

ARTICLE OF REPOSE FOR SUPPORTING THE BODY OF A PERSON

Original Filed Dec. 28, 1954 2 Sheets-Sheet 1

INVENTOR.
Vassili LUCKHARDT, administrator of the Estate of Johannes Luckhardt, deceased

BY

J. K. Fair
ATTORNEY.

ARTICLE OF REPOSE FOR SUPPORTING THE BODY OF A PERSON

Original Filed Dec. 28, 1954 2 Sheets-Sheet 2

INVENTOR.
Wassili LUCKHARDT, administrator of the Estate of Johannes Luckhardt, deceased
BY
J. Wm. Fritz
ATTORNEY.

United States Patent Office

Re. 24,849
Reissued July 26, 1960

24,849

ARTICLE OF REPOSE FOR SUPPORTING THE BODY OF A PERSON

Johannes Luckhardt, deceased, by Wassili Luckhardt, administrator, Berlin-Dahlem, Germany, assignor, by mesne assignments, to Anton Lorenz, Ocean Ridge, Boynton Beach, Fla.

Original No. 2,750,988, dated June 19, 1956, Ser. No. 478,019, Dec. 28, 1954. Application for reissue Oct. 7, 1957, Ser. No. 689,026

17 Claims. (Cl. 155—106)

Matter enclosed in heavy brackets [ ] appears in the original patent but forms no part of this reissue specification; matter printed in italics indicates the additions made by reissue.

This invention relates to articles of furniture and more particularly to articles of repose for supporting the body of a person, wherein a back-rest, seat and leg-rest may be brought from a sitting position into a reclined position and vice versa.

An object of the invention is to provide an article of repose of above described type wherein the link system used in connection with the movable parts of the article is improved so as to permit an easier adjustment.

Another object of the invention is to provide an article of repose of above described type which may be manufactured at low costs.

A further object of the invention is to improve on the construction of articles of repose as now customarily made.

Figure 1:
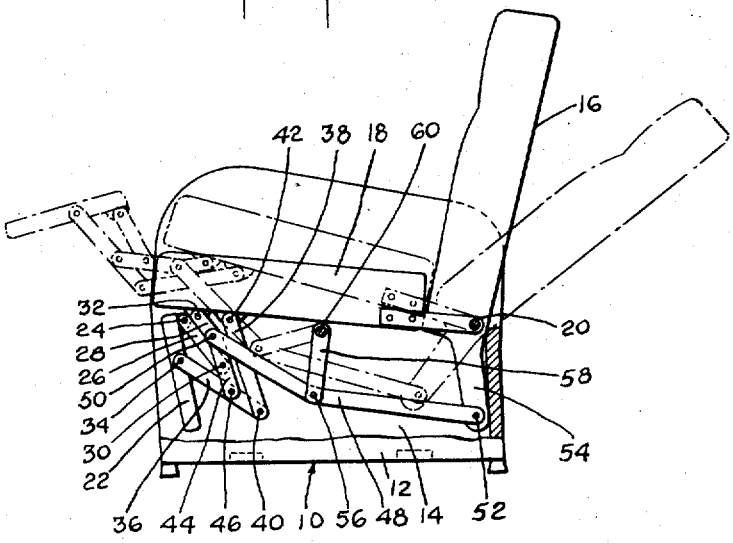
Figure 2:
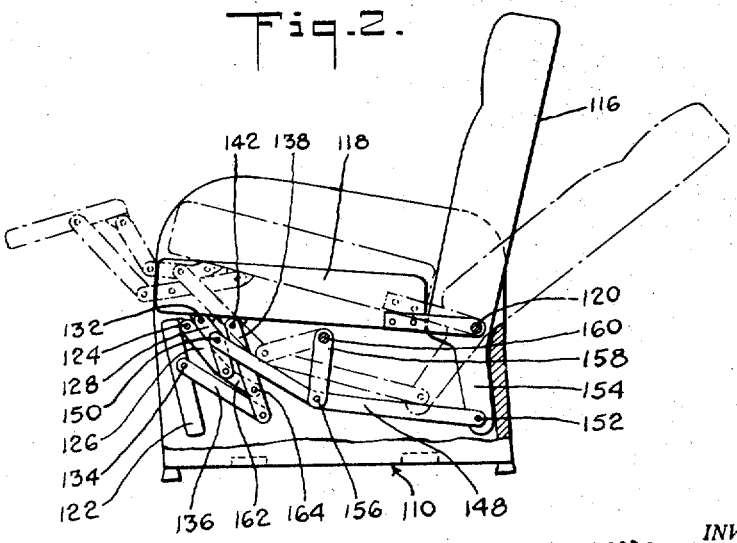
Figure 3:
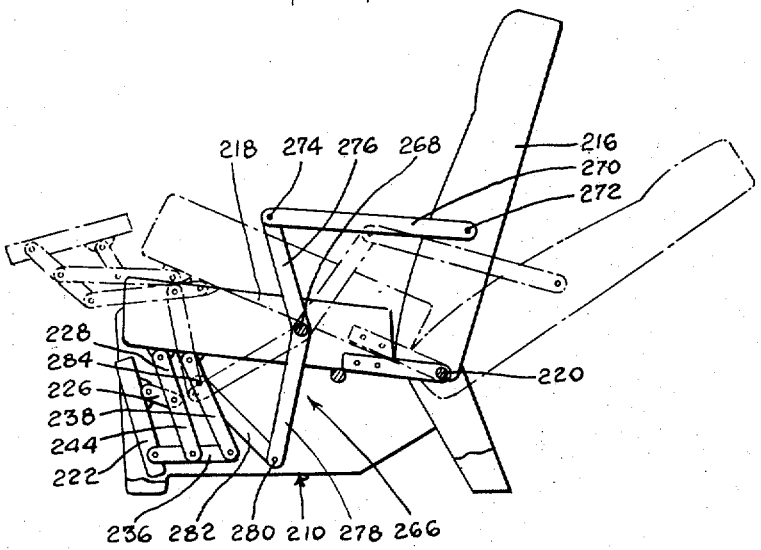
Figure 4:
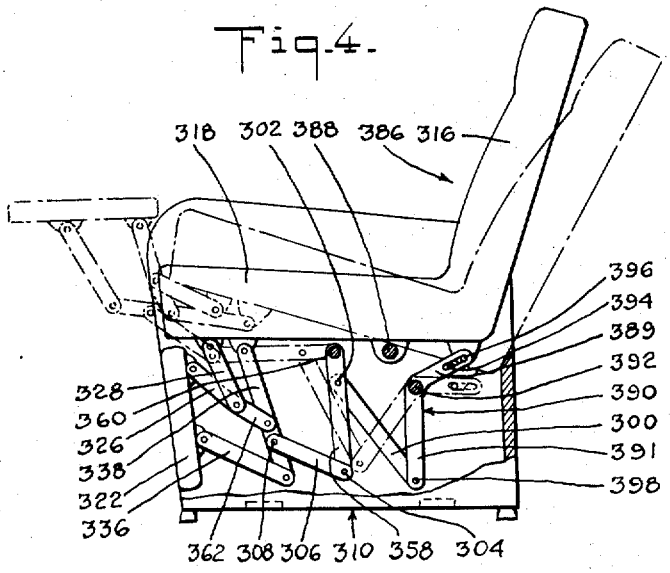

Other objects and structural details of the invention will be apparent from the following description when read in conjunction with the accompanying drawings forming part of this specification, wherein:

Fig. 1 is a side elevational view of a reclining armchair according to the invention, a portion of a side wall being broken away, Fig. 2 is a side elevational view of another embodiment of a reclining armchair according to the invention, a portion of a side wall being broken away, Fig. 3 is a side elevational view of a further embodiment of a reclining armchair according to the invention, a portion of a side wall being broken away, and Fig. 4 is a side elevational view of still another embodiment of a reclining armchair according to the invention, a portion of a side wall being broken away.

Referring now to Fig. 1, 10 generally indicates a base or support comprising side walls 12 and 14 rigidly connected with each other.

Body supporting means comprising a back-rest 16 and a seat 18 are swingably mounted on the base 10 at 20. The back-rest 16 and seat 18 are movable relative to each other.

A leg-rest 22 is pivoted at 24 to a second link 26 of a first pair of links comprising the second link 26 and a first link 28 pivotally connected with each other at 30. The link 28 is pivoted to the seat 18 at 32. Furthermore, the leg-rest 22 is pivoted at 34 to a fourth link 36 of a second pair of links comprising the fourth link 36 and a third link 38 pivotally connected with each other at 40. The link 38 of said second pair of links 36, 38 is pivoted to the seat 18 at 42 at a point to the rear of the pivotal connection 32 between the seat 18 and the link 28 of the first pair of links 26, 28. The pivotal connection 34 between the leg-rest 22 and link 36 of the second pair of links 36, 38 is remote from and below the pivotal connection 24 between the leg-rest 22 and the link 26 of the first pair of links 26, 28.

The link 28 of the first pair of links 26, 28 has an extension 44 rigid therewith. Said extension 44 is pivoted at 46 to the link 36 of the second pair of links 36, 38. Thus, the extension 44 connecting the first pair of links 26, 28 and second pair of links 36, 38 causes a movement of one pair of links in coordination with the movement of the other pair of links.

The front end of a controlling link 48 is pivoted at 50 to the link 28 of the first pair of links 26, 28. The rear end of said controlling link 48 is pivoted at 52 to a downward extension 54 rigid with the back-rest 16. Furthermore the controlling link 48 is pivoted at 56 intermediate its ends to one end of a guiding link 58 the other end of which is pivoted to the base 10 at 60. The controlling link 48 and the guiding link 58 constitute controlling means controlling the movements of the leg-rest.

When a person resting on the chair leans the weight of his body against the back-rest 16 so as to swing same around its pivot 20 into the reclined position shown in dash-and-dot lines, the seat 18 and the leg-rest 22 are brought into the position shown in dash-and-dot lines by means of the link mechanism described above.

According to the embodiment of a reclining armchair shown in Fig. 2, again the back-rest 116 and seat 118 are swingably mounted on the base 110 at 120. Furthermore, again the leg-rest 122 is pivoted at 124 and 134 to the second and fourth links 126 and 136 respectively of a first pair of second and first links 126, 128 and a second pair of fourth and third links 136, 138, the links 128 and 138 of the said pairs of links being pivoted to the seat 118 at 132 and 142 respectively. Moreover, again the controlling link 148 is pivoted to the link 128 of the first pair of links 126, 128 at 150 and to the downward extension 154 of the back-rest 116 at 152. Also, the guiding link 158, is pivoted to said controlling link 148 at 156 and to the base 110 at 160.

The controlling link 148 and the guiding link 158 again constitute controlling means controlling the movements of the leg-rest.

However according to said embodiment shown in Fig. 2, the coordination of the movements of the first pair of links 126, 128 and the second pair of links 136, 138 is obtained in a different way. According to Fig. 2, the link 126 of the first pair of links 126, 128 has an extension 162 rigid therewith and pivoted to the link 138 of the second pair of links 136, 138 at 164.

The sitting position of the movable members of the chair is shown in full lines and the reclined position of said movable members of the chair is shown in dash-and-dot lines. The constrained movements of the back-rest 116, seat 118 and leg-rest 122 are obtained by the link mechanism described above.

According to Fig. 3, the back-rest 216 and seat 218 are rockably mounted on the base 210 at 220.

The arrangement of the first pair of second and first links 226, 228, the second pair of fourth and third links 236, 238, the leg-rest 222 and the connection 244 between said two pairs of links and the pivotal connections of said pairs of links to the seat 218 and to the leg-rest 222 substantially correspond to the arrangement shown in Fig. 1.

However the movements of said two pairs of links 226, 228 and 236, 238 respectively and of the leg-rest 222 are controlled in a different way.

According to Fig. 3 a double-armed lever generally indicated by 266 is swingably mounted on the base 210 at 268. A top link or arm-rest 270 is pivoted at its ends 272 and 274 to the back-rest 216 and one arm 276 of the double-armed lever 266 respectively. The other arm 278 of the double-armed lever 266 is pivoted at 280 to one end of a lower link 282, the other end of which is pivoted at 284 to the link 238 of the second pair of links 236, 238.

The double-armed lever 266, the top link 270 and the lower link 282 constitute controlling means controlling the movements of the leg-rest.

Again the movements of the seat 218 and leg-rest 222 are positively controlled by the mechanism described above in dependence on movements of the back-rest 216. The sitting position is shown in full lines and a reclined position is shown in dash-and-dot lines.

According to the embodiment shown in Fig. 4, the back-rest 316 and seat 318 are rigidly connected with each other so as to form a unit generally indicated by 386. Said unit 386 is rockably mounted on the base 310 at 388. The arrangement of the first pair of second and first links 326, 328, the second pair of fourth and third links 336, 338, the leg-rest 322, and the connection 362 between the two pairs of links and the connection of said two pairs of links to the leg-rest 322 and to the seat portion 318 of the unit 386 substantially correspond to the arrangement shown in Fig. 2.

However the movements of said two pairs of links 326, 328 and 366, 338 and the leg-rest 322 connected thereto are obtained in a different way. According to Fig. 4, an arm 389 of a bell-crank lever 390 swingably mounted on the base 310 at 392 has a slot 394 slidably engaged with a pin 396 carried by the unit 386. The other arm 391 of said bell-crank lever 390 is pivoted at 398 to one end of a controlling link 300, the other end of which is pivoted at 302 to a guiding link 358 swingably mounted on the base 310 at 360. The lower end of said guiding link 358 is pivoted at 304 to one end of another controlling link 306, the other end of which is pivoted at 308 to the link 338 of the second pair of links 336, 338.

The bell-crank lever 390 with its pin and slot connection, the controlling links 300 and 306 and the guiding link 358 constitute controlling means for controlling the movements of the leg-rest.

A movement of the unit 386 from the sitting position shown in full lines into the reclined position shown in dash-and-dot lines causes a movement of the leg-rest 322 into the elevated position shown in dash-and-dot lines by means of the link mechanism described above.

Having described the preferred embodiments of the invention, it is understood that this disclosure is for the purpose of illustration and that various changes in shape and proportion, as well as the substitution of equivalent elements for those herein shown and described may be made without departing from the spirit and scope of the invention as set forth in the appended claims.

For example in the embodiments shown in Figs. 1 and 2, the controlling link 48 or 148 respectively could be pivoted to the link 38 or 138 respectively of the second pair of links instead of to the link 28 or 128 of the first pair of links. While, in the embodiments shown in Figs. 3 and 4, the controlling link 282 or 306 respectively could be pivoted to the link 228 or 328 respectively of the first pair of links instead of to the link 238 or 338 as shown in the drawing.

Furthermore each of the embodiments shown in the drawings may be equipped with limiting means for limiting the sitting position and the extreme recline position.

Moreover in each of the embodiments shown in the drawings locking means may be arranged for holding the movable members of the chair in any desired position.

What is claimed is:

1. An article of repose for supporting the body of a person, comprising: a base, body supporting means including a seat and a back-rest movably mounted on said base, a primary pair of links including a first link and a second link pivotally connected with each other, a secondary pair of links including a third and a fourth link pivotally connected with each other, a leg-rest, said first link being pivoted to said seat at a point remote from its connection with said second link, said second link being pivoted to said leg-rest at a point remote from its connection with said first link, said third link being pivoted to said seat at a point remote from its connection with said fourth link and to the rear of the pivotal connection between said first link and the seat, said fourth link being pivoted to said leg-rest at a point remote from its connection with said third link and below the pivotal connection between said second link and the leg-rest, connecting means engaged with said primary pair of links and said secondary pair of links for effecting movements of said two pairs of links in coordination with each other, and controlling means engaged with said body supporting means, said base and a link of one of said two pairs of links at points remote from the before mentioned connections between the seat and the links of said pairs of links for effecting movements of the pairs of links in coordination with movements of said body supporting means.

2. In an article of repose as claimed in claim 1, said connecting means including an extension of said first link rigid with the latter and pivoted to said fourth link.

3. In an article of response as claimed in claim 1, said connecting means including an extension of said second link rigid with the latter and pivoted to said third link.

4. In an article of repose as claimed in claim 1, said controlling means being engaged with said first link.

5. In an article of repose as claimed in claim 1, said controlling means being engaged with said third link.

6. In an article of repose as claimed in claim 1, said back-rest including an extension rigid with the back-rest, said controlling means comprising a controlling link pivoted to said extension of the back-rest and to a link of one of said two pairs of links, and a guiding link pivoted to said base and to said controlling link intermediate the ends of the latter.

7. In an article of repose as claimed in claim 1, said back-rest including an extension rigid with the back-rest, said controlling means comprising a controlling link pivoted to said extension of the back-rest and to said first link, and a guiding link pivoted to said base and to said controlling link intermediate the ends of the latter.

8. In an article of repose as claimed in claim 1, said connecting means including an extension of said first link rigid with the latter and pivoted to said fourth link, said back-rest including an extension rigid with the back-rest, and said controlling means comprising a controlling link pivoted to said extension of the back-rest and to a link of one of said two pairs of links, and a guiding link pivoted to said base and to said controlling link intermediate the ends of the latter.

9. In an article of repose as claimed in claim 1, said connecting means including an extension of said first link rigid with the latter and pivoted to said fourth link, said back-rest including an extension rigid with the back-rest, and said controlling means comprising a controlling link pivoted to said extension of the back-rest and to said first link, and a guiding link pivoted to said base and to said controlling link intermediate the ends of the latter.

10. In an article of repose as claimed in claim 1, said connecting means including an extension of said second link rigid with the latter and pivoted to said third link, said back-rest including an extension rigid with the back-rest, and said controlling means comprising a controlling link pivoted to said extension of the back-rest and to a link of one of said two pairs of links, and a guiding link pivoted to said base and to said controlling link intermediate the ends of the latter.

11. In an article of repose as claimed in claim 1, said connecting means including an extension of said second link rigid with the latter and pivoted to said third link, said back-rest including an extension rigid with the back-rest, and said controlling means comprising a controlling link pivoted to said extension of the back-rest and to said first link, and a guiding link pivoted to said base and to said controlling link intermediate the ends of the latter.

12. In an article of repose as claimed in claim 1, said controlling means including a double-armed lever pivoted to said base intermediate its ends, a top link pivoted to said back-rest and one arm of said double-armed lever, and a lower link pivoted to the other arm of said double-armed lever and to a link of one of said two pairs of links.

13. In an article of repose as claimed in claim 1, said controlling means including a double-armed lever pivoted to said base intermediate its ends, a top link pivoted to said back-rest and one arm of said double-armed lever, and a lower link pivoted to the other arm of said double-armed lever and to said third link.

14. In an article of repose as claimed in claim 1, said seat and said back-rest being rigid with each other so as to form a unit.

15. In an article of repose as claimed in claim 1, said seat and said back-rest being rigid with each other so as to form a unit, and said controlling means including a double-armed lever pivoted to said base intermediate its ends, a pin and slot connection between said unit and one arm of said double-armed lever, a guiding link swingably mounted on said base, a first controlling link pivoted to the other arm of said double-armed lever and to said guiding link, and a second controlling link pivoted to said guiding link and a link of one of said two pairs of links.

16. In an article of repose as claimed in claim 1, said seat and said back-rest being rigid with each other so as to form a unit, and said controlling means including a double-armed lever pivoted to said base intermediate its ends, a pin and slot connection between said unit and one arm of said double-armed lever, a guiding link swingably mounted on said base, a first controlling link pivoted to the other arm of said double-armed lever and to said guiding link, and a second controlling link pivoted to said guiding link and said third link.

*17. In a reclining chair including a support, body-supporting means including a seat and back-rest mounted on said support for movement into various reclined positions, and a leg-rest positioned beneath said seat and adapted to be moved upwardly and outwardly relative to said seat, the improvement comprising control means for moving said leg-rest in response to reclining movement of said back-rest including a first link pair having first and second links pivotally connected to each other, means operatively connected to said first link and pivotally mounting said first link pair at a first location on said chair, a second link pair having third and fourth links pivotally connected to each other, means operatively connected to said third link and pivotally mounting said second link pair at a second location on said chair spaced from said first location, said first link pair having said first and second links positioned respectively forwardly and above said third and fourth links of said second link pair, a connecting link rigid with one link of said first link pair and having a pivotal connection to one link of said second link pair for effecting movement of said first and second link pairs in coordination with each other, said second link of said first link pair being pivotally connected to said leg-rest at a first location, said fourth link of said second link pair being pivotally connected to said leg-rest at a second location spaced from said first location.*

References Cited in the file of this patent or the original patent

UNITED STATES PATENTS

| | | |
|---|---|---|
| 1,384,932 | Whistance-Smith | July 19, 1921 |
| 2,672,919 | Luckhardt | Mar. 23, 1954 |
| 2,727,561 | Bank et al. | Dec. 20, 1955 |
| 2,781,824 | Lorenz | Feb. 19, 1957 |
| 2,781,825 | Lorenz | Feb. 19, 1957 |

FOREIGN PATENTS

| | | |
|---|---|---|
| 19,394 | Sweden | May 13, 1905 |
| 72,116 | Norway | May 19, 1947 |